(12) United States Patent
Cano et al.

(10) Patent No.: US 7,938,536 B2
(45) Date of Patent: May 10, 2011

(54) PROCESS FOR MANUFACTURING A SERIES OF OPHTHALMIC LENSES AND SHEET OF FILM USED IN SUCH A PROCESS

(75) Inventors: Jean-Paul Cano, Charenton le Pont (FR); Christian Bovet, Charenton le Pont (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 24 days.

(21) Appl. No.: 12/447,952

(22) PCT Filed: Oct. 26, 2007

(86) PCT No.: PCT/EP2007/061518
§ 371 (c)(1),
(2), (4) Date: Aug. 4, 2009

(87) PCT Pub. No.: WO2008/052935
PCT Pub. Date: May 8, 2008

(65) Prior Publication Data
US 2010/0007847 A1 Jan. 14, 2010

(30) Foreign Application Priority Data
Oct. 30, 2006 (FR) ...................................... 06 09516

(51) Int. Cl.
G02C 7/02 (2006.01)

(52) U.S. Cl. ....................................... 351/166; 351/177

(58) Field of Classification Search .................. 351/166, 351/177, 178
See application file for complete search history.

(56) References Cited

U.S. PATENT DOCUMENTS

| | | | |
|---|---|---|---|
| 2,511,329 A | 6/1950 | Craig | |
| 5,764,333 A * | 6/1998 | Somsel | ........................... 351/47 |
| 7,036,929 B1 * | 5/2006 | Harvey | ......................... 351/159 |
| 7,144,529 B1 | 12/2006 | Mercier | |
| 2004/0027327 A1 | 2/2004 | LeCain et al. | |
| 2004/0125337 A1 | 7/2004 | Boulineau et al. | |
| 2004/0190115 A1 | 9/2004 | Liang et al. | |
| 2006/0006336 A1 | 1/2006 | Cano et al. | |
| 2008/0314499 A1 | 12/2008 | Begon et al. | |

FOREIGN PATENT DOCUMENTS

| | | |
|---|---|---|
| FR | 2872589 | 1/2006 |
| WO | WO 2007/144308 | 12/2007 |

* cited by examiner

*Primary Examiner* — Darryl J Collins
(74) *Attorney, Agent, or Firm* — Occhiuti Rohlicek & Tsao LLP (57) ABSTRACT

According to a process for manufacturing a series of ophthalmic lenses, each lens consists of a substrate and a film portion (3) attached to the substrate. The characteristics specific to each lens are obtained by functionalizing the film portion. Film functionalization is carried out when the film is in the form of a large planar sheet (2), and then each portion is cut from the sheet. To obtain economic lens manufacture, with a good production yield, the film portions have, right from the start of the process, dimensions corresponding substantially to the housing of a frame into which each lens is intended to be fitted.

25 Claims, 3 Drawing Sheets

PROCESS FOR MANUFACTURING A SERIES OF OPHTHALMIC LENSES AND SHEET OF FILM USED IN SUCH A PROCESS

CROSS-REFERENCE TO RELATED APPLICATIONS

This application is the National Stage of International Application No. PCT/EP2007/061518, filed on Oct. 26, 2007, which claims the priority of French Application No. 0609516, filed on Oct. 30, 2006. The contents of both applications are hereby incorporated by reference in their entirety.

The present invention relates to a process for manufacturing a series of ophthalmic lenses and to a sheet of film used in such a process.

BACKGROUND OF THE INVENTION

Currently, ophthalmic lenses intended for correcting the ametropia of a wearer consist of a substrate with front and rear faces that have shapes suitable for providing the desired correction. To this purpose, semi-finished lens blanks are mass-produced in factories, with one of the faces of each blank possessing a definitive shape. The other face of each blank is subsequently machined individually according to the ametropia correction prescribed for the wearer, in intermediate laboratories between the factories and the lens sales outlets. Such an organization for the manufacture of ophthalmic lenses requires there to be, in each laboratory, stocks of several models of blanks according to the curvature of the face formed definitively during the production of the blank itself. Depending on the wearer's requirements, additional optical functions, such as for example an anti-reflection function, are added to each lens during separate treatments of the lenses, which consist in covering one or both faces thereof with functional coatings. Such treatments lengthen the timescale for delivering the lenses to the wearer. Finally, the blank is machined around an outline that corresponds to the housing in a frame for a pair of spectacles selected by the wearer, in order to obtain the lens that is fitted into the frame. For this purpose, the spectacle lens blanks each have a sufficient diameter, which is usually between 60 mm and 80 mm (millimeters).

Such an ophthalmic lens manufacturing process is inflexible in that there is no simple way of adding functions to the lens without requiring additional treatment steps to be carried out on the lens. Furthermore, the stocks of blanks that are held in each laboratory require an important and expensive management and logistics system.

In an attempt to remedy these drawbacks, it has been proposed to produce each lens in the form of a substrate on which one or more layers are formed that provide the lens with certain optical functions required by the future wearer thereof, such as an ametropia correction. The number of different substrate models needed to meet all the requirements of a population is then greatly reduced, since some of the characteristics specific to each wearer are produced by means of layers. These layers are produced on demand according to the wearer's prescription and additional optical functions as desired. One way of producing such a functionalized layer consists in irradiating different portions of the layer in a variable and selective manner, so as to vary the optical refractive index between different points on the surface of the lens. However, such a treatment of the layer for obtaining the characteristics specific to each wearer is lengthy to implement when it is carried out on an individual basis and does not allow a large number of different lenses to be rapidly produced one after another.

It is also known to provide certain functions to the lens, such as a polarizing power or an anti-reflection function for example, via a film that is produced independently of the substrate. The film is then attached to a substrate blank, for example by thermal bonding, and then the assembly is machined to the dimensions of the housing in the frame. One drawback of this type of process arises from the deformation that the film undergoes while it is being bonded to the substrate blank. Indeed wrinkles, stretches or tears may occur in the film during bonding.

Moreover, it is also known to produce the optical characteristics that are desired for a lens in the form of an array of separate cells juxtaposed on one of the faces of the lens. Each cell contains a functional material which, by this material varying between neighbouring cells, gives the lens the desired characteristics. For example, it is known in this way to give the lens an optical power by introducing materials having different optical refractive indices into the cells. It is also known to produce in this way a progressive lens or PAL (Progressive Addition Lens) by locally varying, on the lens, the materials contained in cells relative to a lens with cells having a constant optical power. The optical function of the lens is then written into the lens in the form of dots, usually called pixels. The film is then thermally bonded to the substrate. However, in such a process the operations of producing and filling the cells on the curved surface of the lens are difficult to implement.

One drawback of these processes lies in the difficulty in producing different lenses in a continuous and economic manner and with a level of quality suitable for ophthalmic applications.

SUMMARY OF THE INVENTION

An object of the present invention is therefore to provide a process for manufacturing ophthalmic lenses which does not have the abovementioned drawbacks and which, in particular, allows series of different lenses to be produced simply.

To this purpose, the invention provides a process for manufacturing a series of ophthalmic lenses intended to be fitted into respective housings of frames, in which each lens consists of a substrate and a functionalized film portion attached to this substrate. The process comprises the following steps:
  (i) for each ophthalmic lens of the series, collecting the following data:
    dimensions of the frame housing into which this lens is intended to be fitted, and
    optical characteristics of the functionalized film portion corresponding to the lens;
  (ii) determining an arrangement of the film portions in a planar sheet of this film, each portion having substantially the dimensions of the frame housing for the corresponding lens;
  (iii) depositing at least one functional material on each film portion within the sheet of film, this portion having a planar configuration, and this material being suitable for obtaining the optical characteristics of the portion, so as to functionalize the film portion;
  (iv) cutting the functionalized film portions out from the sheet of film; and
  (v) assembling each functionalized film portion with the substrate of the corresponding lens.

Thus, in a process according to the invention, the optical function(s) of each ophthalmic lens is (are) produced by means of the functionalized film portion that is assembled with the substrate. In this way, identical substrates may be used for many different lenses manufactured according to the invention. A small number of different substrate models is therefore sufficient to meet the requirements for a very wide variety of lenses. A long series of these substrates may then be mass-produced for a low cost.

Furthermore, the optical characteristics of the functionalized film portion that corresponds to one of the lenses of the series may be determined according to a prescription for correcting an ametropia of a person wearing this lens. In this case, the characteristics may be adapted so as to compensate for a reduction in a curvature of the lens with respect to the prescription.

A first advantage of a process according to the invention is that the dimensions of the housing in the frame is taken into account when producing each functionalized film portion. The size of the functionalized film portion that is combined in step (v) with the substrate is then minimal. Thus, when the substrate is curved, the deformation undergone by the film portion is reduced. The risk of forming wrinkles, stretches or tears in step (v) is consequently reduced.

The expression "film portions each having substantially the dimensions of the frame housing for the corresponding lens" is understood to mean that each film portion may be slightly larger than the corresponding frame housing, for example by one or several millimeters around the entire circumference of the housing. Such a margin makes it possible to carry out a final machining operation on the assembled lens, in particular after step (v). This margin may also be useful for compensating for any shrinkage of the edge of the functionalized film portion that might occur when deforming it during step (v) of assembling it with the substrate. However, when a functionalized film portion is intended to form a lens for a pair of spectacles, it is advantageous for said portion to be considerably smaller than the substrate blank for this lens. The saving in area of the sheet of film is then approximately equal to the area of substrate that is removed by machining in order to bring the blank to the dimensions of the housing for the lens in the frame for the pair of spectacles.

A second advantage of a process according to the invention stems from the fact that portions of functional materials for all the lenses of the series are deposited on one and the same sheet of film in step (iii) before the sheet is cut up in step (iv). In this way, the operations of depositing the functional materials corresponding to different lenses may be carried out in sequence one after another, without any time being lost between successive deposition operations carried out on different film portions. Step (iii) of the process may thus be carried out for a large number of lenses in a short space of time. To this purpose, data relating to the frames must be introduced at the start of the process, in order to determine that film portion which will be assigned to the production of a given lens. Thus, after step (iii) of a process according to the invention, at least two of the functionalized film portions in the sheet of film may have respective dimensions that are different.

At the same time, certain functionalized film portions in the sheet of film may have optical characteristics that are different.

A third advantage of a process according to the invention results from the planar configuration of each film portion corresponding to a lens at the moment when the functional material portion(s) is (are) deposited on said sheet of film. Thanks to this planar configuration, a simple tool can be used to deposit the portions of functional material. The expression "planar configuration of each film portion" is understood to mean that this film portion has a developable shape, although the portion may possibly be curved in a cylindrical form at the moment of deposition, thanks to the pliancy of the film. Preferably, the entire sheet of film has a planar configuration, put another way it has a developable shape, when the portions of functional material are being deposited on all the film portions.

For these reasons, a process according to the invention allows the rapid production of lenses with a reduced cost and with a high yield, while still meeting the quality criteria compatible with the ophthalmic application of the lenses.

In particular, certain lenses of the series may be lenses that are intended to be fitted into a pair of spectacles. The frame housing considered in steps (i) and (ii) for defining the functionalized film portion is then a housing in the frame for a pair of spectacles.

According to a preferred method of implementing the invention, the sheet of film used in steps (ii) to (iv) has large dimensions. A great number of film portions may then be extracted from the sheet, and step (ii) is carried out simultaneously for all these portions, with the sheet of film passing just once into the deposition tool.

According to a first improvement of the invention, the arrangement of the film portions within the planar sheet of film is determined in step (ii) so as to achieve maximum occupancy of this sheet. A maximum number of film portions corresponding to lenses may thus be extracted from the same sheet of film. These more numerous film portions that are obtained from a given sheet are treated, in step (iii), during one and the same pass of the sheet through the tool for depositing the functional material. In other words, the series of lenses corresponding to a given sheet of film is longer. Furthermore, the waste parts of the sheet of film arising from cutting step (iv) are therefore minimal. In this way, the cost price of each manufactured lens is further reduced.

According to a second improvement of the invention, the optical characteristics of the functionalized film portion that correspond to each lens of the series are produced in step (iii) by depositing the functional material(s) on the sheet of film in the form of separate and juxtaposed portions on this film portion. Such a method of implementing the invention makes it possible to use numerical control to carry out step (iii). More generally, numerical control of step (iii), owing to its flexibility and programming prior to the functional materials being deposited, makes it possible to produce functionalized film portions differing from one another without wasting time. In this way, it is possible to manufacture lenses customized according to their future wearers even more rapidly. The lenses may then be despatched to wearers with short delivery times. In addition to such quality of service, numerical control of step (iii) makes it possible to reduce the cost price of the lenses by simplifying the management of this step.

Optionally, the process may furthermore include, after step (iii), the addition of at least one functional coating on one face of each functionalized film portion. Such a coating enables the final lens to be given one or more additional functions.

The invention also provides a planar, possibly pliant, sheet of film that comprises a series of film portions functionalized by at least one functional material placed on each portion. These portions are suitable for being combined with respective substrates so as to form ophthalmic lenses and have respective dimensions that correspond to frame housings into which the lenses are intended to be fitted. Such a sheet, which may be obtained after step (iii) of a process as described above, constitutes a semi-finished product that can be easily transported, if necessary.

At least two of the functionalized film portions that are produced in the sheet of film may have respective dimensions and/or optical characteristics that are different.

According to the preferred embodiment of such a sheet of film, the functional material(s) is (are) placed on each functionalized film portion of this sheet in the form of separate portions of material(s) that are juxtaposed on the film portion. The functional portions of material(s) thus constitute a pixellated structure. Furthermore, each functionalized film portion may correspond to an array of cells carried by the sheet of film in such a way that each portion of functional material is contained within a cell. Such a structure may provide effective retention of the functional materials, especially when these are liquids or in the form of gels, since the portions of functional material(s) are thus isolated from one another. In this way, the functionalized film portion in its entirety is not affected, and maintains its optical property, even when one of the cells of this functionalized film portion is damaged. Furthermore, different functional materials contained in neighbouring cells cannot mix by diffusion. The ophthalmic lens obtained then has an unlimited lifetime. To achieve this, the sheet of film may furthermore include a sealing film arranged on the cells, so as to seal them. Preferably, such a film for sealing the cells continuously covers all of the functionalized film portions in the planar sheet of film.

The sheet of film may furthermore include at least one functional coating placed on a face of at least one of the functionalized film portions. Such a functional coating may, without being limiting and as an example, be an anti-reflection coating, an anti-impact coating, an anti-soiling coating, an antistatic coating, an anti-abrasion coating, a reflecting coating, a polarizing coating, a photochromic coating, a tinted coating, or a combination of some of said coatings. It may continuously cover all of the functionalized film portions on the sheet of film. The functional coating may be initially provided, particularly inexpensively, in the form of a roll of functional film produced in great length. This is then unwound and then applied to the planar sheet of film comprising the functionalized film portions between steps (iii) and (iv).

When the cells have been sealed off by a sealing film, the functional coating may advantageously be supported by the latter. The sealing film with the functional coating can then be manufactured independently of the sheet of film and attached to it, for example by adhesively bonding it on all the cells. Such a method improves the manufacturing yield, by separating the wastage due to defects in manufacturing the functionalized film portions from that due to defects in the functional coating.

In a sheet according to the invention, at least one of the functionalized film portions may have progressive lens characteristics. This functionalized film portion or another such portion may moreover have an area that is not intended to participate in the vision of a person wearing the corresponding lens, a polarizing area, a coloured area, a photochromic area, etc.

The invention also provides a planar functionalized film portion obtained by cutting a sheet of film as described above.

Finally, the invention provides an ophthalmic lens obtained by a manufacturing process according to the invention.

BRIEF DESCRIPTION OF THE DRAWINGS

Other features and advantages of the present invention will become apparent in the following description of a non-limiting exemplary embodiment, with reference to the appended drawings in which.

For the sake of clarity of FIGS. 2-7, the dimensions of the various elements shown are not in proportion with actual dimensions and ratios of dimensions. Furthermore, identical references on different figures denote identical elements.

DETAILED DESCRIPTION

In the description that follows, manufacturing steps known to those skilled in the art will not be described in detail, rather indications sufficient to allow the invention to be reproduced will just be given. Furthermore, throughout the description, the numerical references denoting steps of the process according to the invention relate to FIG. 1.

The manufacture of an ophthalmic lens according to the invention requires principally two elements: a lens substrate and a functionalized film portion intended to be attached to one face of the substrate. Given that all the characteristics of the final lens that depend on a future person wearing it, or a large number of these characteristics, are provided by the functionalized film portion, the substrate may be a model common to a large number of ophthalmic lenses. The features that are provided by the functionalized film portion may comprise in particular ametropia correction characteristics, geometric characteristics pertaining to the frame into which the lens is intended to be fitted, or other characteristics specific to a particular order for a lens. In other words, the substrate of a lens may be produced before the order for the lens by a customer has been received, although it is preferable to produce the functionalized film portion knowing beforehand all the characteristics of the lens desired by the customer.

Figure 2A:
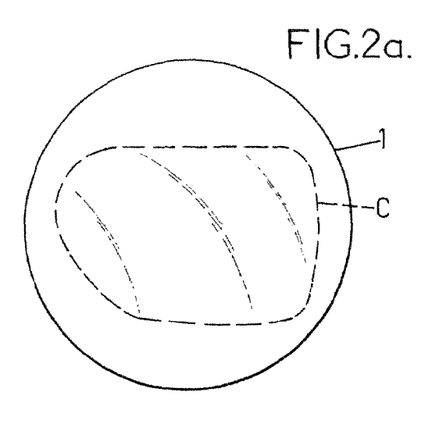
FIGS. 2a and 2b show an ophthalmic lens blank in plan view and in sectional view respectively.
Figures 2B, 3:
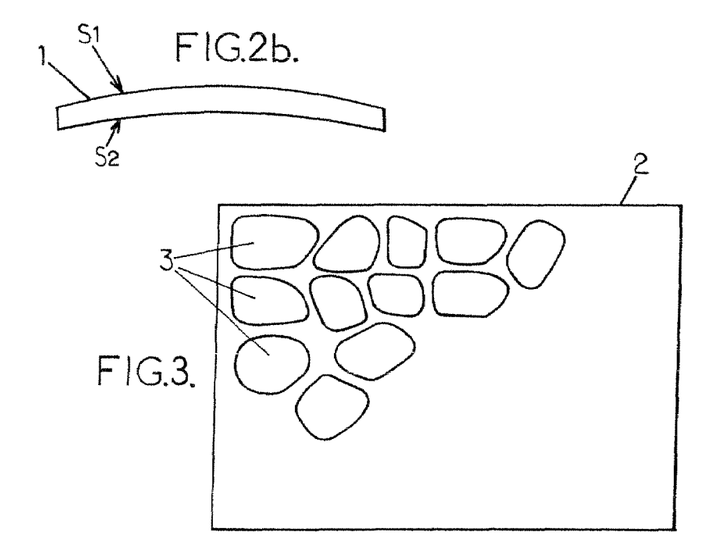
FIG. 3 illustrates the arrangement of film portions corresponding to respective lenses in a sheet of film.
Figure 2C:
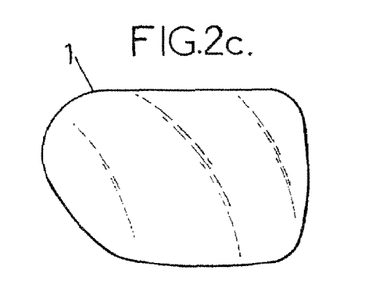
FIG. 2c shows a lens cut from the blank of FIGS. 2a and 2b.

As shown in FIGS. 2a and 2b, the substrate 1 may initially be in the form of a blank having a convex front face denoted by S1 and a concave rear face denoted by S2. The faces S1 and S2 may be parallel to each other, so that they do not by themselves give the lens an optical power. Alternatively, they may be selected so as initially to give the lens certain base characteristics. In this case, these base characteristics will be combined with the characteristics provided by the functionalized film portion. The substrate 1 may have for example a diameter of 80 mm (millimeters), sufficient to be machined to the dimensions of the lens housing in any frame for a pair of spectacles. The machined outline is denoted by C in FIG. 2a, and FIG. 2c shows the substrate 1 machined to the dimensions of the housing of the frame.

The substrate 1 may be machined to the dimensions of the housing of the frame either before the assembly of the substrate with a functionalized film portion, or after such an assembly. It may be advantageous to machine the substrate to the dimensions of the frame after such an assembly, so as to make it easier to keep the substrate in the assembly tool.

The substrate 1 may be made of any transparent material, in particular the organic, mineral or composite materials already used at the present time to produce ophthalmic lenses. Optionally, the substrate 1 may be made of a tinted or filtering material, for example to obtain contrast enhancement or solar protection functions. It may also be made of a photochrome material, incorporate a photovoltaic cell, or have other features intended for the production of specific lenses.

Figure 1:
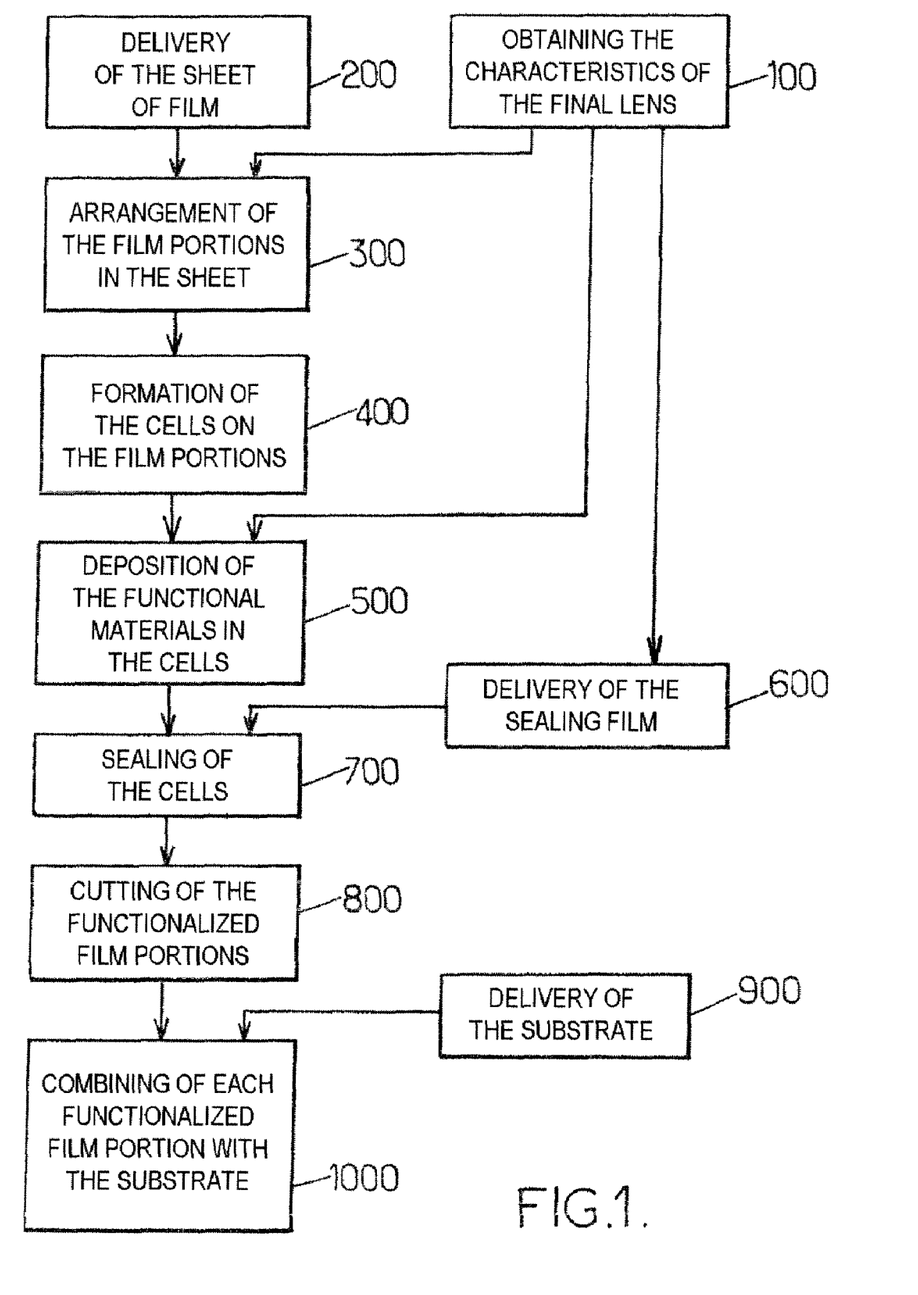
FIG. 1 is a flowchart showing the steps in the manufacture of an ophthalmic lens according to the invention.

The process starts with the collecting of the characteristics of the final lens that are desired by the future wearer thereof (step 100). These characteristics may for example be collected when the wearer is ordering the lens at an opticians. They comprise, on the one hand, the dimensions of the housing in the frame into which the lens is intended to be fitted, according to the frame selected by the customer, and on the other hand, optical characteristics of the lens. Depending on these latter optical characteristics and on the substrate data, optical characteristics of the functionalized film portion that will be attached to the substrate are determined so as to obtain the optical characteristics of the final lens.

The optical characteristics of the functionalized film portion may in particular comprise:
- characteristics for correcting the wearer's ametropia;
- data for positioning, relative to the frame housing, characteristics of a progressive lens or PAL;
- data for positioning, relative to the frame housing, at least one opaque area of the lens, such as a logo or a miniature photovoltaic cell, which is incorporated into the lens;
- data for positioning at least one polarizing area of the lens relative to the frame housing;
- data for positioning at least one coloured area of the functionalized film portion relative to the frame housing; and/or
- data for positioning at least one photochromic area of the functionalized film portion relative to the frame housing.

When the function of the functionalized film portion is a large ametropia correction, this portion may furthermore be adapted so as to compensate for a reduction in curvature of the substrate relative to a lens of the same power produced by moulding and machining. To this purpose, optical asphericity characteristics have to be conferred on the functionalized film portion so as to reduce optical aberrations and distortions due to the use of a less curved substrate. In this way, the substrate may have a smaller thickness, either at the centre, for a positive optical power, or on the periphery, for a negative optical power. The lens is then lighter and is more comfortable to wear. Furthermore, a reduction in the curvature of the substrate also decreases the deformation of the functionalized film portion generated when this portion is combined with the substrate.

Step 200 of the process consists in obtaining a sheet of transparent film, which is intended to be functionalized in portions of the sheet corresponding to the ophthalmic lenses to be manufactured. To produce a large number of lenses in one and the same implementation of the process, the sheet has dimensions sufficient to provide, when it is cut up, a large number of film portions to the dimensions of the respective lenses fitted into the frames. For this reason in particular, the dimensions of the sheet of film are preferably equal to or greater than 320 mm×380 mm.

The sheet of film may be made of any transparent material, such as polycarbonate, polyimide, polyethylene, polyethylene terephthalate, etc. It is planar and has a suitable thickness so as to be pliant, to be able to be curved in a cylindrical fashion at room temperature if necessary, and to be able to be deformed by heating it, so as to give it locally a non-developable shape. However, at room temperature, the sheet of film still has a developable shape until the functionalized film portions are cut out. For example, the sheet of film may have a thickness of between 10 μm (microns) and 200 μm.

The arrangement, in the sheet of film, of the film portions to be produced that will correspond to the lenses of a given series is then determined (step 300). These portions will be subsequently obtained by cutting them out of the sheet. To produce a larger number of lenses with a given sheet of film, film portions with dimensions equal to or slightly greater than those of the locations of lenses in spectacle frames are used. This avoids film wastage, which corresponds to the reduction in area of the lenses relative to the corresponding blanks during the machining operation illustrated by FIGS. 2a and 2c.

For example, it is possible to obtain when cutting, from a sheet of film measuring 320 mm×380 mm, twelve film portions each in the form of a disc 80 mm in diameter, corresponding to substrate blanks, while it is possible to obtain sixty-three film portions each lying within a rectangle measuring 35 mm×50 mm and ninety film portions each lying within a rectangle measuring 30 mm×40 mm. In addition, it is possible to further increase the number of film portions that are obtained from a given sheet by rotating the portions in the plane of the sheet so that they are more tightly interleaved. Such an arrangement of the film portions in the planar sheet of film may be determined numerically. Many algorithms can be used to do this, some of which execute an iterative procedure, by simulating several possible arrangements and by selecting from them the one that corresponds to maximum occupancy of the sheet of film.

FIG. 3 reproduces an optimized arrangement. In this figure, the references 2 and 3 denote, respectively, the uncut sheet of film and the film portions corresponding to the ophthalmic lenses during production.

Figure 4:
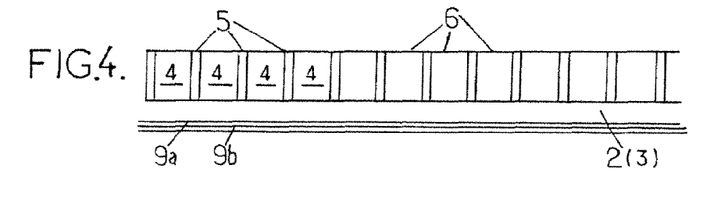
FIG. 4 is a sectional view of a functionalized film portion before the cells are sealed.

Arrays of juxtaposed cells are then formed on the sheet 2, over the entire surface of each portion 3 (step 400). To this end, a lithographic method may be used, whereby a layer of lithography resist is deposited over the entire planar sheet, then irradiated at certain locations, and dissolved selectively with respect to the irradiated locations. An array of walls separating the cells from one another is thus produced. Optionally, the lithography resist may be deposited on the sheet using a material-jet head, of the inkjet head type, and by scanning the surface of the sheet with the head. To this purpose, the material-jet head may be moved past the sheet 2 using a stepper motor. Optionally, the shape of the cells may be varied locally within a portion, or from one portion to another, depending on the optical function of each portion 3. To reduce the consumption of resist, the latter may be deposited on the sheet 2 only within the portions 3. Advantageously, the irradiation of the resist and, optionally, its deposition, may be numerically controlled. Optionally, a lithography mask may be used for the irradiation. FIG. 4 illustrates the structure that is thus obtained on the sheet of film 2. This structure comprises cells 4 that are separated by walls 5. The cells 4 may form an array of any pattern in each film portion 3, namely a triangular, square, hexagonal or even random pattern.

The height of the walls 5, measured perpendicular to the film 2, may have any value. For example, it may be equal to approximately 10 μm. The thickness of the walls 5, measured parallel to the sheet 2, is adjusted so as to obtain a fill factor, for filling each portion with cells 4, of greater than 95%, or even greater than 98%. In this way, the optical function conferred by the film portion on the final lens may have a high amplitude.

Next, portions of functional materials 6 are deposited inside the cells 4 (step 500). The cells 4 may be dimensioned so that each portion of functional material 6 has dimensions of between 1 μm and 500 μm, or preferably between 5 μm and 200 μm, measured parallel to the sheet of film 2. The functional material deposited in each cell 4 is selected so as to obtain the desired optical function in the final lens. For example, in order to give the substrate an optical power, transparent materials having variable values of optical refractive index are introduced into the cells 4. To this end, it may be advantageous to form the functional material that is introduced into each cell 4 by mixing two components of materials having extreme index values, and to vary the proportion of each component from one cell to another. Reference may be made to documents known to those skilled in the art in order to determine the refractive index distribution that is needed in a film portion so as to give it an optical power or a particular progressive lens design.

The portion of functional material 6 that is introduced into each cell 4 may also contain one or more dyes, so as to locally tint the final lens. Gradations or variations in colour saturation may be obtained by varying the concentration of the dyes on neighbouring cells 4.

Advantageously, the portions of functional materials 6 are deposited in the cells 4 in a single pass of the entire sheet of film 2 through a deposition tool. The portions of functional material 6 are deposited in all the film portions 3 corresponding to the lenses of the series to be produced, during the same pass of the sheet 2. Preferably, this step of depositing the functional materials is numerically controlled so as to be able to be programmed beforehand, in parallel, according to all the features of the portions 3 that have to be produced for the lenses of the series. The execution of this step of the process is then rapid.

For this step of depositing the portions of functional materials 6, it is highly advantageous for the sheet 2 to have a planar configuration, or possibly a cylindrically curved one, since a simplified deposition tool may be used that causes a deposition head to move past the sheet 2 so as to scan the entire surface thereof. When the deposition head passes above a cell 4, it is activated so as to deposit a portion of functional material into it. In particular, a material-jet printing head may be used to deposit the portions of functional materials 6 in the cells 4. When a portion 6 consists of a mixture of two or more components, this mixture may be produced directly inside the corresponding cell 4, by depositing into it the respective suitable amounts of the components. To do this, two or more orifices in the material-jet head are connected to respective reservoirs for supplying the components of functional material.

It should be understood that many variants may be introduced into the process for producing the functionalized film portions that has just been described. For example, the sheet of film 2 may be provided in step 200 with an array of cells 4 already formed over its entire surface. It is then possible to arrange the portions 3 over the entire surface of the sheet 2, leaving unnecessary cells between the portions 3.

It is also possible to deposit solid portions of functional materials 6 or portions in the form of liquid with a sufficient viscosity, without it being necessary for cells to be present beforehand on the sheet of film 2. In this case, a transparent encapsulating substance is advantageously deposited on top of the portions 6, so as to protect and fix them.

Figure 5:
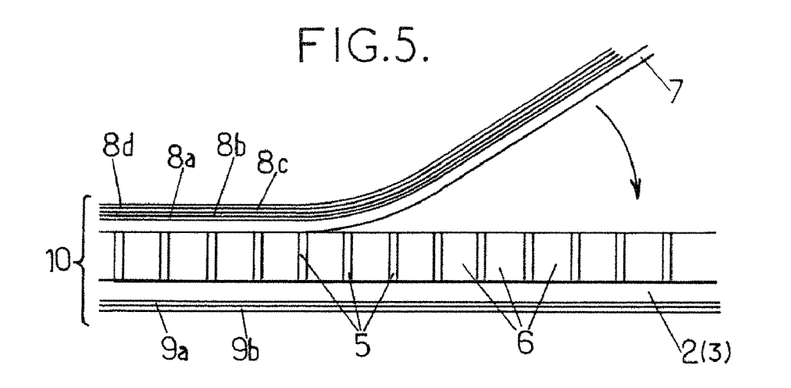
FIG. 5 illustrates the step of sealing the cells of a functionalized film portion.

When the portions of functional materials 6 have been deposited in cells 4, it is advantageous thereafter to hermetically seal the cells (steps 600 and 700). To this end, a sealing film 7 is applied to the cells, so that it adheres to the tops of the walls 5. Such a film is transparent and may have one of the compositions mentioned above in the case of the sheet 2. It has a suitable thickness so as to be pliant, in order to make it easier to apply to the sheet 2, on the side facing the cells 4. It may be obtained initially in the form of a roll, that can be delivered according to the dimensions of the sheet of film 2. The sealing film 7 is bonded or heat-sealed to the tops of the walls 5. According to one particularly advantageous option, the sealing film 7 is applied simultaneously to the entire surface of the sheet 2, for example by lamination, so as to cover, in a continuous manner, all of the functionalized film portions 3 on the sheet 2. Such an application of the sealing film, which is carried out over a large area, before the portions 3 are cut out individually from the sheet 2, may be particularly rapid and uniform.

Optionally, the sealing film 7 may carry one or more functional coatings 8a-8c on the opposite side of this film from the face applied to the cells 4. The functional coatings 8a-8c may for example be an anti-impact coating, an anti-reflection coating and an anti-soiling coating respectively. In FIG. 5, the reference 10 denotes the structure that each functionalized film portion 3 now has, as regards the embodiment of the invention that will be described here.

The sealing film 7, together with the optional functional coatings 8a-8c, may furthermore be provided with a peelable protective film 8d on its opposite face from that intended to be applied against the cells 4. Such a film, which is optional, protects the coatings 8a-8c before the film 7 is used, and subsequently. It can be removed at the end of the process for manufacturing the lens, or even after the lens has been fitted into the frame of a pair of spectacles. It allows the external face of the sealing film 7, or the functional coatings 8a-8c when these are present, to be protected from being accidentally soiled or scratched.

The functionalized film portions 3, optionally covered with the sealing film 7, are then individually cut out from the sheet 2 (step 800), for example using a laser cutting tool. Each portion 3 is then carefully handled, for example using a suction device, so as not to create any accidental scratches on one face thereof.

Finally, each functionalized film portion 3 is combined with a substrate 1 (steps 900 and 1000). At this moment in the process, each portion 3 still has a planar configuration, and that face of the substrate 1 which is intended to receive the portion 3 may be curved, either concave or convex. In particular, it is possible for this surface of the substrate 1 not to be developable. The portion 3 is then applied to this face while deforming this portion. As it is known, the deformation undergone by a planar portion when it is applied to a curved support is approximately equal to $(h/2R)^2$, where h is the radius of the planar portion relative to a centre thereof and R is the radius of curvature of the support. Consequently, the deformation undergone by each functionalized film portion 3 when it is applied to the substrate 1 is smaller the smaller the area of the portion 3. For this additional reason, it is particularly advantageous to transfer onto the substrates 1 portions 3 that have already approximately the dimensions of the machined lenses. To give an illustration, the deformation $(h/2R)^2$ is about 4% in the case of a film disc 80 mm in diameter and less than 2.3% in the case of a portion in the form of a frame housing lying within a rectangle measuring 50 mm×35 mm.

Figure 6:
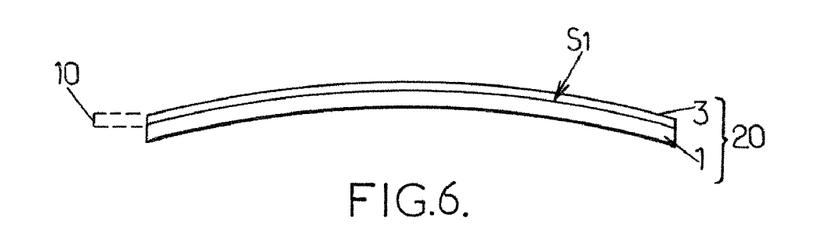
FIG. 6 is a sectional view of an ophthalmic lens obtained by a process according to the invention.

One of the application methods already known can be used to apply each functionalized film portion 3 to the corresponding substrate 1. During this application, the portion 3 may possibly undergo stretches that are liable to cause small variations in the dimensions of said portion. In this case, these variations in the dimensions of the portion 3 may be taken into account initially, with respect to the dimensions of the frame housing, in order finally to obtain a lens having the dimensions of the housing, which is entirely covered by the portion 3. FIG. 6 illustrates the ophthalmic lens thus obtained, which is referenced as 20.

Figure 7:
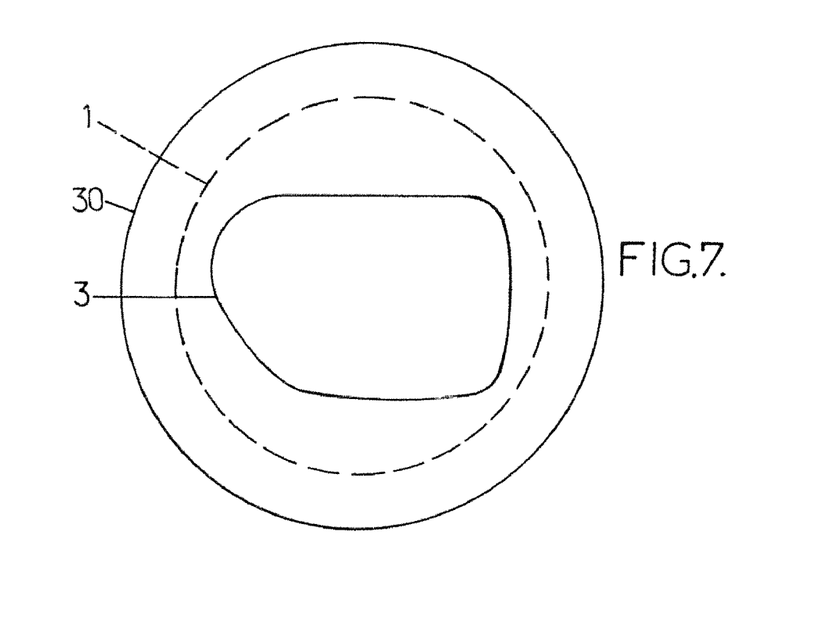
FIG. 7 is a plan view of a functionalized film portion fastened to a transfer film.

The method of combining the portion 3 with the substrate 1 may be selected so as to reduce the stresses undergone by the functionalized film portion 3 when it is deformed. In particular, the portion 3 may be carried by a transfer film that can be deformed at the moment of combining with the substrate 1. The portion may be bonded to the transfer film, for example on the same side as the film 7. It is then deformed at the same time as the transfer film. In FIG. 7, the transfer film 30 is larger than the substrate 1, which is represented by the superimposed dashes, or larger than the substrate blank. It may thus be held firmly while being deformed by applying the film 30 against the substrate 1. In this way, the stresses that are undergone by the array of cells 4 are reduced so that the walls 5 are neither crushed or nor damaged, despite the deformation of the portion 3. The transfer film 30 is then removed from the lens 20, either individually, by peeling it, or at the same time as the film 8d. The removal of the film 30 may be delayed until the end of the process for manufacturing the lens 20, so that the film 30 constitutes a temporary protection of the functionalized film portion 3 and of the optional functional coatings 8a-8c.

According to one particularly advantageous method of operation, the sheet of film 2 is provided in step 100 with an adhesive film 9a and with a peelable protective film or liner 9b (see FIGS. 4 and 5). The adhesive film 9a and the peelable liner 9b are carried by that face of the sheet 2 on the opposite side from that intended to receive the portions of functional materials 6. The adhesive film 9a and the liner 9b are cut in step 800 at the same time as the film portion 3. During step 1000, of combining the portion 3 with the support 1, the peelable liner 9b is firstly removed and then the portion 3 is applied against the substrate 1 via its face that bears the adhesive film 9a.

The lens 20, i.e. the substrate 1 with the portion 3 bonded on top of it and optionally with the transfer film 30, can then be machined to its definitive outline and fitted into the frame for which it is intended.

Of course, the method of implementing the invention that has been described in detail above has been given merely as an illustration. Many modifications of this method of implementation may be introduced, whilst still maintaining at least some of the advantages of the invention. In particular, the dimensions of the sheet of film 2 that is used to produce a series of ophthalmic lenses in a single pass for depositing functional materials may be increased. A larger number of lenses may then be produced in parallel.

A person skilled in the art himself will appreciate the economic and commercial advantages of an ophthalmic lens manufacturing process according to the present invention. In particular, the variety of lenses that can be produced in this way is unlimited, depending on the functional materials used. These materials may vary in refractive index, they may vary in colour or may even possess a property that varies reversibly in response to an appropriate stimulus. In other words, such a manufacturing process may be used to manufacture both passive ophthalmic lenses and active lenses, also called "smart glasses".

All the orders for lenses customized according to their wearers may be received in a laboratory. These are then scheduled in a consistent manner by a computer so as to form a series of lenses that allows maximum utilization of the area of a flat sheet of film. Each film portion is then produced according to customized characteristics, either by varying the structure of the cells or by varying the functional materials that are deposited in them.

Finally, a process according to the invention can also be used to produce an ophthalmic lens that is intended to be fitted into a frame other than that for a pair of spectacles. It may form a glass for a sports mask or a protective mask, for a helmet sight, or a cabin window glass, etc. Such a glass, which is also intended for human vision, may readily be manufactured at the same time as lenses for pairs of spectacles, by combining the respective functionalized film portions in one and the same sheet of film 2.

The invention claimed is:

1. Process for manufacturing a series of ophthalmic lenses intended to be fitted into respective housings of frames, each lens consisting of a substrate and a functionalized film portion attached to the substrate, the process comprising the following steps:
   for each ophthalmic lens of the series, collecting the following data:
      dimensions of the frame housing into which said lens is intended to be fitted, and
      optical characteristics of the functionalized film portion corresponding to said lens;
   (ii) determining an arrangement of the film portion in a planar sheet of said film, each portion having substantially the dimensions of the frame housing for the corresponding lens;
   (iii) depositing at least one functional material on each film portion within the sheet of film, said portion having a planar configuration, and said material being suitable for obtaining the optical characteristics of said portion, so as to functionalize said film portion, for each lens of the series, the optical characteristics of the corresponding functionalized film portion are produced by depositing said at least one functional material on the planar sheet of film in the form of separate and juxtaposed portions on the film portion, each portion of functional material having dimensions of between 1 μm and 500 μm measured parallel to the sheet of film;
   (iv) cutting the functionalized film portions out from the sheet of film; and
   (v) assembling each functionalized film portion with the substrate of the corresponding lens.

2. Process according to claim 1, in which, after step (iii), at least two of the functionalized film portions within the sheet of film have different respective dimensions and/or optical characteristics.

3. Process according to claim 1, in which the optical characteristics of the functionalized film portion corresponding to at least one of the lenses of the series are determined according to a prescription for correcting an ametropia of a person wearing said lens.

4. Process according to claim 1, in which, in step (ii), the arrangement of the film portions within the planar sheet of film is determined numerically and iteratively, by simulating several possible arrangements and by selecting one of said possible arrangements that corresponds to maximum occupancy of the sheet of film by said portions.

5. Process according to claim 1, in which the substrate of at least one of the lenses of the series has a curved surface, and in which the corresponding functionalized film portion is applied to said curved surface in step (v) while deforming said functionalized film portion.

6. Process according to claim 5, in which the curved surface of the substrate is not developable.

7. Process according to claim 5, in which the functionalized film portion is carried by a transfer film that can be deformed when said functionalized film portion is assembled with the corresponding lens substrate in step (v).

8. Process according to claim 1, in which the portions of functional material are deposited on the sheet of film into respective cells formed beforehand on said sheet of film.

9. Process according to claim 8, which furthermore includes a step of hermetically sealing the cells, which is performed between steps (iii) and (v).

10. Process according to claim 1, which furthermore includes, after step (iii), the addition of at least one functional coating on a face of each functionalized film portion.

11. Process according to claim 10, in which the functional coating is added before step (iv), so as to continuously cover all of the functionalized film portions on the planar sheet of film.

12. Process according to claim 10, in which the portions of functional material are deposited on the sheet of film into respective cells formed beforehand on said sheet of film, the functional coating being carried by a sealing film, said sealing film being applied onto the cells so as to hermetically seal said cells.

13. Process according to claim 10, in which the functional coating is initially provided in the form of a roll of functional film, said functional film being unwound and then applied between steps (iii) and (iv) onto the planar sheet of film comprising the functionalized film portions.

14. Process according to claim 1, in which the optical characteristics of the functionalized film portion corresponding to one of the lenses of the series comprise positioning data selected from:
  positioning data for characteristics of a progressive lens positioning it with respect to the frame housing into which said lens is intended to be fitted,
  data for positioning an opaque area of the lens with respect to the frame housing into which said lens is intended to be fitted,
  data for positioning a polarizing area of the lens with respect to the frame housing into which said lens is intended to be fitted,
  data for positioning a coloured area of said functionalized film portion with respect to the frame housing into which said lens is intended to be fitted, and
  data for positioning a photochromic area of said functionalized film portion with respect to the frame housing into which said lens is intended to be fitted.

15. Process for manufacturing a series of ophthalmic lenses intended to be fitted into respective housings of frames, each lens consisting of a substrate and a functionalized film portion attached to the substrate, the process comprising the following steps:
  (i) for each ophthalmic lens of the series, collecting the following data:
    dimensions of the frame housing into which said lens is intended to be fitted, and
    optical characteristics of the functionalized film portion corresponding to said lens;
  (ii) determining an arrangement of the film portion in a planar sheet of said film, each portion having substantially the dimensions of the frame housing for the corresponding lens;
  (iii) depositing at least one functional material on each film portion within the sheet of film, said portion having a planar configuration, and said material being suitable for obtaining the optical characteristics of said portion, so as to functionalize said film portion, the optical characteristics of the functionalized film portion determined according to the prescription are adapted in order to compensate for a reduction in a curvature of the lens relative to said prescription.

16. Planar sheet of film comprising a series of film portions functionalized by at least one functional material arranged on each portion, said portions being combined with respective substrates so as to form ophthalmic lenses, and said portions having respective dimensions corresponding approximately to frame housings into which said lenses are intended to be fitted, the at least one functional material being arranged on each functionalized film portion in the form of separate and juxtaposed portions on said film portion, each portion of functional material having dimensions of between 1 µm and 500 µm, measured parallel to the sheet of film.

17. Sheet according to claim 16, in which at least two of said functionalized film portions have different respective dimensions and/or optical characteristics.

18. Sheet according to claim 16, in which at least one of the functionalized film portions has dimensions corresponding approximately to a housing in a frame for a pair of spectacles, into which frame the lens corresponding to said film portion is intended to be fitted.

19. Sheet according to claim 16, in which at least one of the functionalized film portions has optical characteristics corresponding to a prescription for correcting an ametropia of a person wearing the lens corresponding to said film portion.

20. Sheet according to claim 16, comprising groups of cells corresponding respectively to the functionalized film portions, each cell containing a portion of functional material.

21. Sheet according to claim 20, which furthermore includes a film for sealing the cells, which is arranged on said cells, said film for sealing the cells continuously covering all of the functionalized film portions in the planar sheet of film.

22. Sheet according to claim 21, in which the functional coating is carried by the film for sealing the cells.

23. Sheet according to claim 16, which furthermore includes at least one functional coating arranged on a face of at least one of the functionalized film portions.

24. Sheet according to claim 23, in which the functional coating is selected from an anti-reflection coating, an anti-impact coating, an anti-soiling coating, an antistatic coating, an anti-abrasion coating, a reflecting coating, a polarizing coating, a photochromic coating, a tinted coating, or a combination of some of said coatings.

25. Planar sheet of film comprising a series of film portions functionalized by at least one functional material arranged on each portion, said portions being combined with respective substrates so as to form ophthalmic lenses, and said portions having respective dimensions corresponding approximately to frame housings into which said lenses are intended to be fitted, in which the optical characteristics of the functionalized film portion determined according to the prescription are adapted so as to compensate for a reduction in a curvature of the lens with respect to said prescription.

* * * * *